United States Patent [19]

Seehawer

[11] 3,765,083

[45] Oct. 16, 1973

[54] METHOD OF MAKING A HEAD USING A TAPE GAP

[75] Inventor: Eberhard M. Seehawer, Berlin, Germany

[73] Assignee: Firma Wolfgang Bogen GmbH, Berlin, Germany

[22] Filed: Feb. 22, 1971

[21] Appl. No.: 117,639

[30] Foreign Application Priority Data

Feb. 27, 1970 Germany.................. P 20 09 376.9

[52] U.S. Cl. ...... 29/603, 179/100.2 C, 340/174.1 F

[51] Int. Cl. .......................... G11b 5/22, G11b 5/42

[58] Field of Search................ 29/603; 179/100.2 C; 340/174.1 F; 346/74 MC

[56] References Cited

UNITED STATES PATENTS

| | | | |
|---|---|---|---|
| 2,772,135 | 11/1956 | Hollabough et al.......... | 179/100.2 C |
| 2,361,752 | 10/1944 | Eilenberger.................. | 179/100.2 C |
| 3,564,521 | 2/1971 | Trimble et al................ | 340/174.1 F |
| 2,941,045 | 6/1960 | Connell........................ | 179/100.2 C |
| 3,467,789 | 9/1969 | Johnson et al. .............. | 340/174.1 F |
| 3,516,152 | 6/1970 | Austen......................... | 179/100.2 C |

*Primary Examiner*—Bernard Konick
*Assistant Examiner*—Jay P. Lucas
*Attorney*—Cushman, Darby & Cushman

[57] ABSTRACT

A method for producing magnetic heads and magnetic heads whereby a non-magnetic rectilinear tape is stretched tautly in a slit of a non-magnetic base body also having recessed portions on both sides of the tape and channels for receiving the ends of a U-shaped magnetic core. The ends are placed in the channels and the recessed portions filled with soft magnetic material which thus magnetically connects the tape, which forms the gap, to the core ends. To form a multitrack head a base body having a plurality of successive pairs of channels and recessed portions adjacent the tape can be employed. If desired a shearing gap can also be provided in another location in the core.

3 Claims, 2 Drawing Figures

INVENTOR
EBERHARD SEEHAWER
BY
Cushman, Darby & Cushman
ATTORNEYS

METHOD OF MAKING A HEAD USING A TAPE GAP

BRIEF DESCRIPTION OF THE PRIOR ART AND SUMMARY OF THE INVENTION

The invention relates to a method for producing magnetic heads and a magnetic head.

Magnetic heads are conventionally employed for recording, reproducing and erasing information on magnetic carriers, such as magnetic tape. Most magnetic heads are similar in structure with a ring-shaped soft magnetic core whichcarries one or more coils of insulated copper or other wire. In order that the magnetic flux may emerge from the magnetic head during recording and that it may re-enter again during the reproducing process, the ring-shaped core normally has a non-magnetic gap which lies radially transverse to the ring. For physical reasons, this gap must be very narrow (a practical value is approximately 5 $\mu$m), the size depending on the information that is to be received or recorded, and moreover the edges of the gap must be, as precisely as possible,in a straight line. The planes of the gap forming surfaces in the toroidal core are usually therefore finely lapped with optical precision. In order for the gap to be stable in its dimensions, it is generally filled with a non-magnetic insert made of bronze, mica, quartz or something similar.

The magnetic carrier, be it a tape, collar, plate or some other effective geometric shape, is moved past the magnetic head by conventional mechanical arrangements to record or reproduce information on the carrier. For recording a suitable modulated current is passed through the coil of copper wire on the toroidal core to magnetize in a coding pattern successive portions of the carrier. For reproduction, the voltage produced in the coil by the flux which passes through the coil as the carrier passes the head is detected and conventionally employed. The erasing magnetic head is constructed similarly with a broader gap and the current which flows through the erasing coil is higher so that all magnetization on the carrier is reliably erased.

The heretofore known processes for the production of magnetic heads required a considerable technological knowhow with regard to maintaining the geometry of the gap of the magnetic head, which is decisive in regard to quality. Expensive grinding and lapping processes have been used to maintain the surfaces limiting the gap in a state for proper functioning. Another difficulty is that the texture of the soft magnetic raw material in the zone of the gap must not be destroyed by the processing, since it would then lose magnetic permeability and thus a broad gap with characteristics which decrease quality would result. A progressive increase in the difficulties in manufacture results in production of conventional multitrack magnetic heads, i.e. several independent magnetic systems housed in one magnetic head, especially when the gaps in the toroidal cores must be precisely located perpendicularly one above the other.

The present invention relates to a method of eliminating these manufacturing difficulties in the construction of the magnetic heads. First, a taut stretched tape is absolutely rectilinear. This absolute rectilinearity can be employed to produce a gap with such rectilinearity by placing a length of taut tape or foil in the gap to form the non-magnetic insert and then forming the toroidal core or a part of it with its gap limiting surfaces abutting the taut tape which forms the gap steaming on, spraying on or galvanic deposit. Thus, the tightened tape insert in the gap determines the linearity of the one or more gaps of the magnetic head.

Many other objectios and purposes of the invention will be apparent from the following description of the drawings in which.

Figure 1:
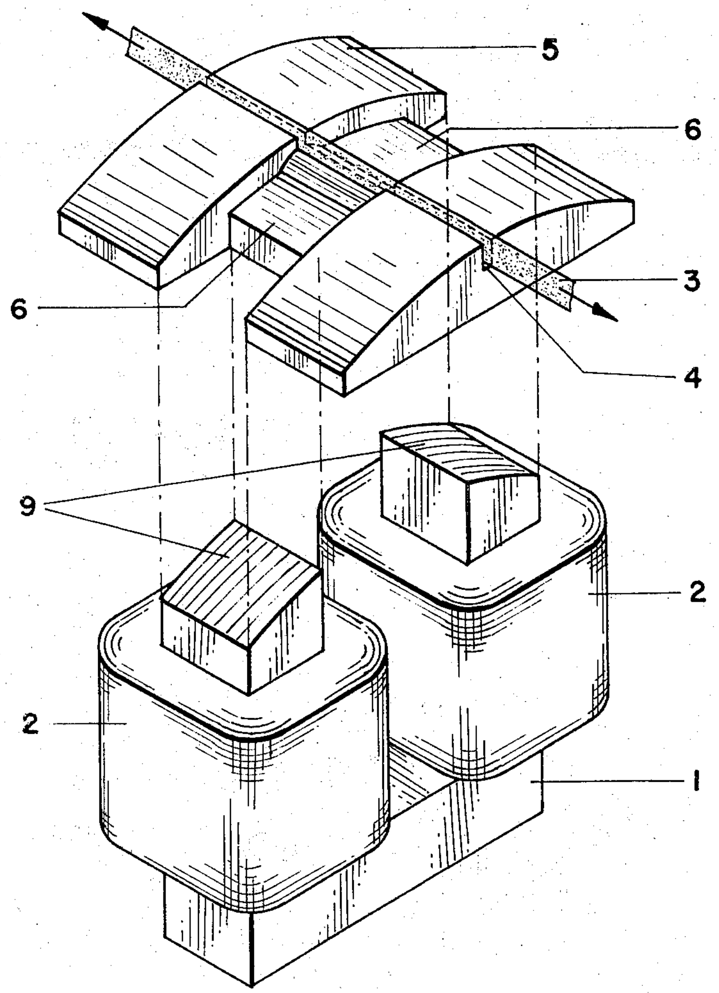
FIG. 1 shows a magnetic head according to this invention prior to assembly.

As shown in FIG. 1, a soft magnetic member, in this case U-shaped magnetic core 1, carries a pair of coils 2 of copper wire. The tape or foil insert 3 for the gap has been inserted and tightened tautly in a slit 4 of the non-magnetic base body 5. In its middle portion, the base body 5 has recesses 6, the depth of which corresponds to the desired thickness of the toroidal core.

Figure 2:
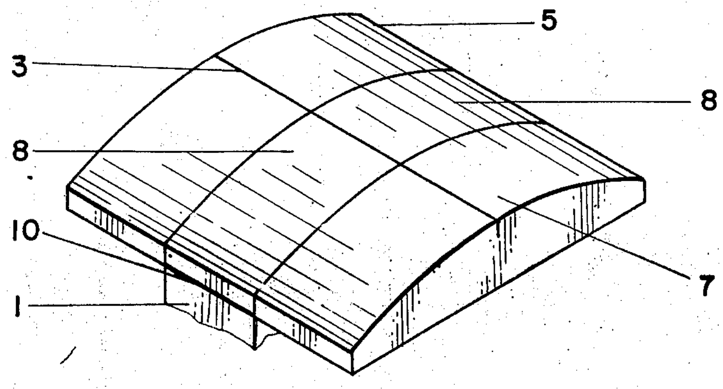
FIG. 2 shows an assembled head.

After placing the magnetic core 1, provided with coils 2, on base body 5, the recesses 6 are filled — for example, by a known process, such as steaming on, spraying on or by galvanic processes — with a soft magnetic raw material of suitable composition up to the pole tips 8 which, as shown in FIG. 2, are separated by tape or foil insert 3, After smoothly polishing the top surface 7 of base body 5, the magnetic head is finished and ready to function. The U-shaped magnetic core 1, pole tips 8 and also base body 5 may consist of metallic or ceramic raw materials. Instead of two coils, other arrangements can be used which are sensitive to magnetic flux, such as Hall probes, field plates, etc.

In the case of recording heads, often a shearing gap is provided in the rear part of the toroidal core, so that a possible magnetic remanence of the toroidal core on the operating gap, which is formed by the insert 3 in the gap, will not become essentially noticeable. As is well know, a larger remanence raises the noise level of the recording. The head shown in FIG. 2 has a shearing gap 10 which may be formed by non-magnetic covers (foils or similar things) on surfaces 9 or by steaming on, spraying on or galvanic application of non-magnetic material, such as quartz, aluminum, etc., onto surfaces 9.

Multitrack magnetic heads are built up analogously to the described single track magnetic head. Base body 5 then has a number of recesses 6 which correspond to the number of tracks, and the number of U-shaped or similar magnetic cores, each wound with one or more coils. A single gap insert 3 is inserted into slit 4 and tightened tautly across all recesses 6 of the multitrack base body. All recesses will now be filled up by means of the above mentioned processes to pole tips 8.

To make sure that only recesses 6 will be filled up with the soft magnetic raw material, as it is applied, diaphragms can be placed on body 5 to cover the surfaces of the base body that are not to be filled up. For mass production of multitrack heads, long base bodies which then can be cut into individual magnetic heads are preferable.

However, it may be desirable under some circumstances to make the base body with the gap insert and the pole tips and the rear part of the toroidal core with the coils separately and to store them separately in order to be able to adapt the magnetic head during assembly to any special requirements.

What is claimed is:

1. A method for producing a magnetic head having a plurality of tracks and having a corresponding number of magnetic cores each with ends and a non-magnetic gap comprising the steps of:

stretching a length of rectilinear non-magnetic tape at the desired location of said gap, placing said tape in a slit in a non-magnetic base body having a plurality of receiving channels for each receiving the ends of a core and a plurality of recessed portions each associated with one of said receiving channels for each magnetically connecting the ends of said core in the associated receiving channels, applying a soft magnetic material to said core so that said material abuts said tape and forms the pole tips of said core, including filling said soft magnetic material into each of said recessed portions so that said soft magnetic material magnetically connects said tape to said ends of each of said cores.

2. A method as in claim 1 wherein each said core has a rear part and including forming a shearing gap on the pole surfaces of the rear part of said core prior to said step of applying.

3. A method as in claim 1 including the further step of separating said cores linked by said tape to produce a head having the desired number of tracks.

* * * * *